US012764185B2

(12) United States Patent
Esfahani

(10) Patent No.: US 12,764,185 B2
(45) Date of Patent: Oct. 13, 2026

(54) GENERATION OF COLLECTIONS AND OFFLINE FOLDER SYNCHRONIZATION FOR CONTENT MANAGEMENT SYSTEMS

(71) Applicant: Open Text Corporation, Waterloo (CA)

(72) Inventor: Matin Esfahani, Kitchener (CA)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 17/471,770

(22) Filed: Sep. 10, 2021

(65) Prior Publication Data

US 2022/0078234 A1 Mar. 10, 2022

Related U.S. Application Data

(60) Provisional application No. 63/076,813, filed on Sep. 10, 2020.

(51) Int. Cl.

*H04L 67/1095* (2022.01)
*G06F 16/176* (2019.01)
*G06F 16/178* (2019.01)
*H04L 67/5683* (2022.01)

(52) U.S. Cl.

CPC ........ *H04L 67/1095* (2013.01); *G06F 16/176* (2019.01); *G06F 16/178* (2019.01); *H04L 67/5683* (2022.05)

(58) Field of Classification Search

None

See application file for complete search history.

(56) References Cited

U.S. PATENT DOCUMENTS 7,359,991 B2 * 4/2008 Balducci ................. H04L 51/58 709/248
8,768,962 B2 * 7/2014 Laron ................. G06F 16/1734 707/706
9,996,535 B1 * 6/2018 Skidmore ............... G06F 16/93
10,133,816 B1 * 11/2018 Bilinski .................. G06F 16/68
10,474,348 B2 * 11/2019 Cho ......................... G06F 16/54
11,455,345 B2 * 9/2022 Underwood .......... G06F 40/197
2002/0029244 A1 * 3/2002 Suzuki ...................... G06F 8/65 709/203
2005/0055354 A1 * 3/2005 Thompson ............ G06F 21/604
2009/0157811 A1 * 6/2009 Bailor ................... G06F 40/166 709/204
2009/0327294 A1 * 12/2009 Bailor ................... G06F 40/166 707/999.009
2013/0054514 A1 * 2/2013 Barrett-Kahn ...... G06F 16/9574 707/E17.005
2013/0132463 A1 * 5/2013 Garcia-Ascanio ........................... H04L 67/1095 709/203
2013/0138608 A1 * 5/2013 Smith ..................... G06F 16/27 707/610

(Continued)

*Primary Examiner* — Backhean Tiv
(74) *Attorney, Agent, or Firm* — Sprinkle IP Law Group

(57) ABSTRACT

Embodiments of content management systems in which content items can be selectively shared and synchronized are disclosed. An administrator can configure and edit collections of content items and control sharing of the content items with other users. The system enables collections to be downloaded to mobile devices for offline usage. After downloading the system provides mechanisms for maintaining synchronization of offline content with the content management system.

19 Claims, 10 Drawing Sheets

(56) References Cited

U.S. PATENT DOCUMENTS

| | | | | |
|---|---|---|---|---|
| 2013/0218829 | A1* | 8/2013 | Martinez | G06Q 10/10 707/608 |
| 2014/0195516 | A1* | 7/2014 | Balakrishnan | G06F 16/168 707/722 |
| 2014/0282078 | A1* | 9/2014 | Taylor | G06F 40/197 715/751 |
| 2015/0012488 | A1* | 1/2015 | van Rossum | G06F 16/1767 707/611 |
| 2015/0234856 | A1* | 8/2015 | Havekes | G06F 16/176 707/781 |
| 2015/0278330 | A1* | 10/2015 | Hawa | G06F 16/275 709/203 |
| 2016/0034433 | A1* | 2/2016 | Yamat | G06F 3/04842 715/229 |
| 2016/0162839 | A1* | 6/2016 | Smith | H04L 51/066 709/219 |
| 2016/0291856 | A1* | 10/2016 | von Muhlen | H04L 67/06 |
| 2017/0286711 | A1* | 10/2017 | Negrea | H04L 63/10 |
| 2018/0189317 | A1* | 7/2018 | Kambuj | G06F 16/178 |
| 2019/0121995 | A1* | 4/2019 | Niu | G06F 16/219 |
| 2019/0180189 | A1* | 6/2019 | Biesemann | G06N 3/10 |
| 2020/0117705 | A1* | 4/2020 | Hance | G06F 16/152 |
| 2021/0072971 | A1* | 3/2021 | Jeong | G06F 9/4451 |
| 2022/0078234 | A1* | 3/2022 | Esfahani | H04L 67/1095 |

* cited by examiner

GENERATION OF COLLECTIONS AND OFFLINE FOLDER SYNCHRONIZATION FOR CONTENT MANAGEMENT SYSTEMS

CROSS-REFERENCE TO RELATED APPLICATION(S)

This application claims a benefit of priority under 35 U.S.C. § 119 (e) from U.S. Provisional Application No. 63/076,813, filed Sep. 10, 2020, entitled "GENERATION OF COLLECTIONS AND OFFLINE FOLDER SYNCHRONIZATION FOR CONTENT MANAGEMENT SYSTEMS," which is fully incorporated by reference herein for all purposes.

TECHNICAL FIELD

This disclosure relates generally to managing content in a distributed networked computing environment. More particularly, embodiments of this disclosure relates to sharing content in a distributed networked content management environment. Even more particularly, embodiments of this disclosure relate to selectively sharing and synchronizing content in a distributed networked content management environment.

BACKGROUND

Typical content management systems provide the functionality needed for securely sharing and collaborating on projects with other users behind and beyond a corporate firewall. In some applications of a content management system, a goal is for users in an industry to have access to accurate and updated information and documents while out in the field. For example, electrical utility field workers out in the field performing maintenance activities may need to have access to the most recent documents needed for maintenance activities. If this information is not available, or is outdated, the maintenance activities can be adversely affected. While a content management system may provide some functionality, sometimes field workers will need access to this information at sites with no internet access. Therefore, with typical systems, the user will have to download the needed information ahead of time. However, even if the user downloads the documents ahead of time to a mobile device, the documents may become out of date by the time the user needs to access them.

Some conventional content management systems enable sharing of documents and folders with other users. However, in conventional content management systems, shared files and folders are typically shared exactly the way that they are structured in the internal system (e.g., grouped by folder, taxonomy, etc.). When these files and folders are shared outside the system, the items can only be shared as a whole. There is a need in the art to enable users to share individual files and folders or sub-sets of folders, regardless of how they are stored in the system.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

SUMMARY

Figure 1:
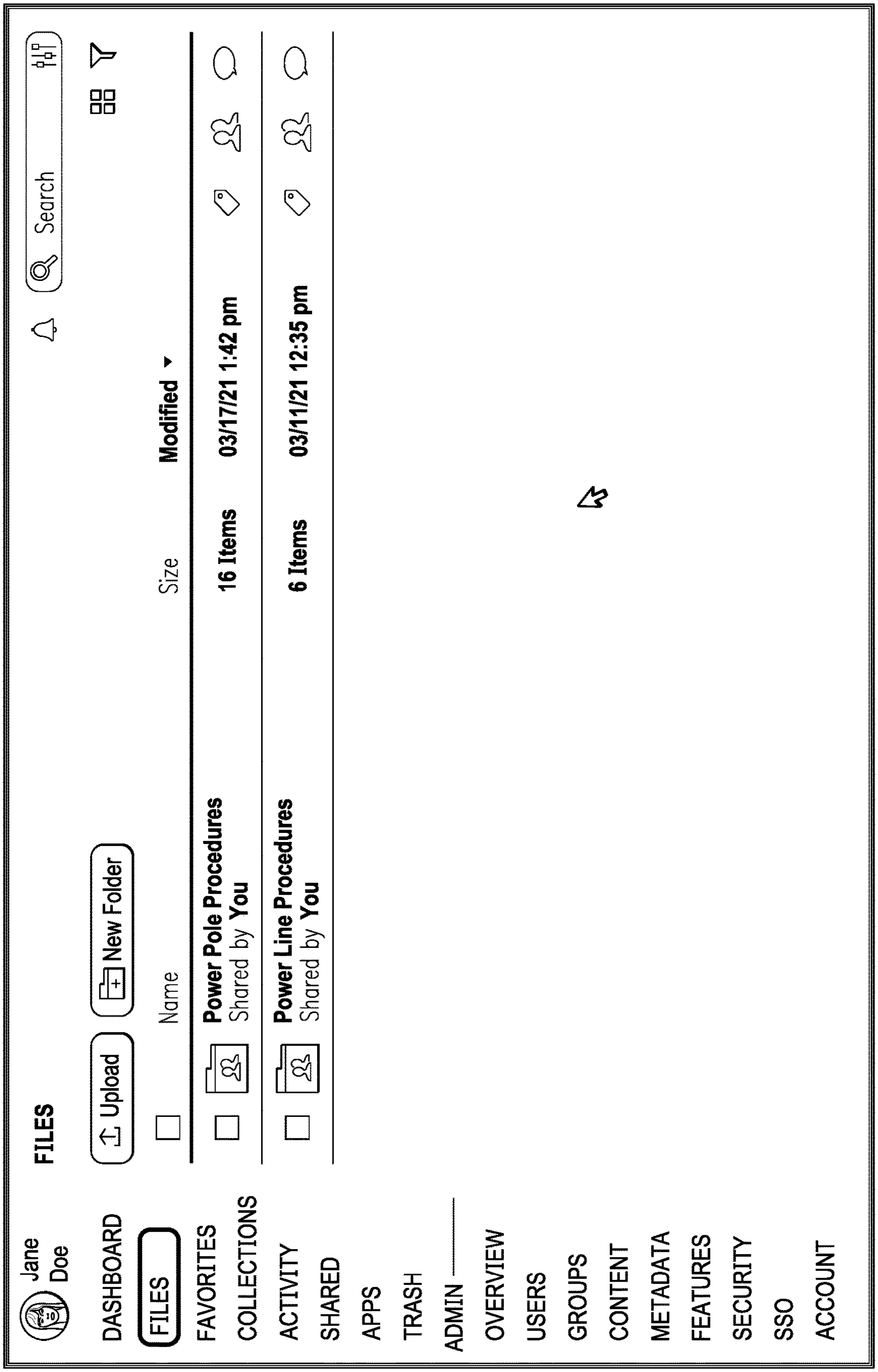
FIG. 1 is a diagram showing a screenshot of a display on a collection administrator's PC, showing content items stored in a data store(s).

Accordingly, to address these issues, among other ends, embodiments of the system, method, and computer program product disclosed herein enable the creation, sharing, and synchronization of virtual collections of content items selected from content items stored in a data store.

In some embodiments, a system for managing content includes a processor and a memory coupled with the processor, wherein the memory is configured to provide the processor with instructions which when executed cause the processor to store a plurality of content items in a data store of the system, select and tag a subset of the stored content items to create a collection of content items, provide a user with access to the collection of content items, responsive to a request from the user, send, to a remote device controlled by the user, the collection of content items, receive, from the remote device, a request to synchronize the collection of content items stored on the remote device with the collection of content items stored in the data store, and responsive to the request, synchronize the collection of content items stored on the remote device with the collection of content items stored in the data store.

In some embodiments, a computer program product includes instructions for storing a plurality of content items in a data store of a content management system, selecting and tagging a subset of the stored content items to create a collection of content items, providing a user with access to the collection of content items, responsive to a request from the user, sending, to a remote device controlled by the user, the collection of content items, receiving, from the remote device, a request to synchronize the collection of content items stored on the remote device with the collection of content items stored in the data store, and responsive to the request, synchronizing the collection of content items stored on the remote device with the collection of content items stored in the data store.

In some embodiments, a method of managing content in a content management system includes storing a plurality of content items in a data store of the content management system, selecting and tagging a subset of the stored content items to create a collection of content items, providing a user with access to the collection of content items, responsive to a request from the user, sending, to a remote device controlled by the user, the collection of content items, receiving, from the remote device, a request to synchronize the collection of content items stored on the remote device with the collection of content items stored in the data store, and responsive to the request, synchronizing the collection of content items stored on the remote device with the collection of content items stored in the data store.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DETAILED DISCLOSURE

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments described herein provide mechanisms by which users of content management systems can create and edit collections of items (files, folders, etc.) in the content management system. Created collections can be shared with other users or groups of users of the content management system. Shared collections can be updated, as needed. Items in a collection may be downloaded to user devices for offline usage. Updates/synchronizations to collections can occur automatically and/or manually, as desired. Embodiments described herein provide the ability to provide users of a content management system with current information and documents, as well as to download information automatically, enabling users to have access to the information and documents, even when at locations with no internet access.

While embodiments can be applied to any field of use, for the purposes of this disclosure, the invention will be described in the context of one exemplary implementation-providing documents to electrical maintenance field workers in an electric utility company. In this use case, several features are desired. For example, it is desired for the utility company to be able to share various documents and information with third party contractors that may be responsible for performing maintenance and other activities in the field. One challenge is that these documents are stored on an on-premises repository behind a firewall, and are not accessible to the contractors. It is desired for the content to be available to the contractors on the cloud, and for the content to be available to the contractors offline on a mobile device. In addition, the shared content has been kept as up-to-date as possible, to ensure that the contractors have the correct information on their mobile devices. Another feature desired in this use case is to provide the ability to select or group certain files (into a virtual collection) that are needed in the field, without having to share every file in a folder, for example. When a user is in the field, it is important that the user have access to the selected files (the collection), and sharing unneeded files can be complicated and result in mistakes in the field.

Embodiments described herein enable the ability to provide users (e.g., field workers) of a content management system with current information and documents, as well as to download information automatically, enabling the field workers to have access to the information and documents, even when at sites with no internet access.

In this exemplary implementation of the invention (providing documents to electrical maintenance field workers), an office worker at an electric utility company selects and/or uploads documents to the content management system. Once the documents are selected and/or uploaded, the system enables the documents (or sub-sets of the documents, as described below) to be automatically downloaded (pushed) to mobile devices of the field workers when they have internet access. In addition, once downloaded, the system can constantly keep the documents up-to-date, so when accessed by the field workers, the field worker will have the most up-to-date files (described in detail below).

Following is an example of a use case of the invention, in the exemplary context of the electric utility company, discussed above. In this exemplary use case, an office worker ("Jane Doe", the collection administrator in the figures described below) has access to all of the relevant files needed by various field workers ("Bob", the collections viewer in the figures described below) while performing maintenance activities. The office worker, using the content management system, can create a "collection" by tagging files and/or folders and giving the collection a name. In some embodiments, users can navigate to the desired files, and select/tag the files for inclusion in a collection. In some embodiments, during creation of a collection, users of the system can drag and drop files and folders into the collection to tag them. Note that collections can relate to subject matter, region, user groups, etc., as desired. In some examples, lists of files and folders can be rules-based. A user can curate lists of files/folders without modifying folder structures or duplicating content in the content management system, which can be especially important for files originating from other repositories. Note that permissions associated with files can be taken into consideration. For example, if a collection contains item(s) that a user does not have permission to access, the respective item may not be shown to that user when accessing that collection (discussed in more detail below).

Collections can be shared with multiple users or groups of users. While all of the documents in the collection may be spread across multiple folders and hierarchies, they are now all within a single "collection." As a result, if a field worker wants to download all of the documents in the collection at once, the user can select the collection on their mobile device (e.g., via a mobile application, web interface, etc.) to mark the document for offline use, and the documents in the collection will be downloaded to the user's mobile device and will be available offline in an "offline folders" tab. This provides a significant improvement over getting a list of relevant documents, and selecting individual folders across many folders for download, which would be very time consuming and unreliable.

When a user (e.g., a field worker) accesses information using their mobile application, the user may see one or more collections on their mobile device. Instead of having to go to individual files and folders, the user can view the collections, and mark a collection for offline availability. In the background, the system starts to download the files and folders that are part of the selected collection. In some examples (described below), collections can be downloaded and updated automatically.

As mentioned, the system can keep offline files and folders of a collection up to date automatically, although, in some embodiments, with some user intervention/confirmation. Collections can be kept up to date using different methods, as desired. In one exemplary implementation, a notification API is used to check for any sort of changes relating to anything in a collection marked as available offline on a respective user device (in one example, listed in an offline tab on the user's mobile device). Based on notifications from the API, the system finds any differences between what is in the offline tab and what is in the cloud. The user's device is then notified of these changes, and informs the user that these changes have been detected. The user can be prompted to take the needed steps to update the collection. For example, a notification may say "Warning. File X is out of date." The user may be presented with a sync button, which starts a synchronization process.

In a second exemplary implementation, the system also periodically traverses every file and folder of a collection to look for any changes. This process may be slower [that] than the notification technique, but may be more comprehensive and reliable. This process can be implemented on demand or periodically (e.g., daily, etc.). When changes are found using this implementation, a user can be notified the next time the user opens the mobile application, and the updates can be initiated. In one example, the first implementation is performed whenever a user is online with the mobile application, and the second implementation is performed periodically (e.g., at a predetermined schedule), in the background.

In one embodiment, the second implementation is initiated as a scheduled task of the operating system. This process begins by sending a network request to the server, asking for a list of all items in a given folder/collection/etc. The server returns with the requested information. The system traverses every file and folder and sub-folder of a particular collection. It may be unknown how long this process will take. Also note that this process happens for every user of the system. With the received information, the system looks at information such as version numbers, modification dates, files sizes, etc., and compares this information with what is in the offline tab on the mobile device. When this information matches a particular file or folder in the offline tab for a particular device/user, it is determined that the respective file or folder is up to date. If not, the respective file or folder marked for an update. Note that performing an "update" could include overwriting a file, deleting a file, adding a file, adding a version, etc. In some examples, when a file is marked for deletion (i.e., the file is present in the offline tab, but has been deleted at the server), the file can be automatically deleted on the mobile device, rather than waiting for the notification process.

When notifying a user of an event, such as a change/update to a collection, the event may indicate that a file or folder has been moved, copied, updated, resaved, etc. When an event is recorded by the system, it is recorded into the notification API with an identification attached to it. When a user selects the offline tab to access files in a collection, the user is presented with the offline tab content. At the same time, in the background, the application calls the notification API to check for any new notifications, and if there, the notification(s) are returned to the user's mobile device, which will indicate any differences to collections since the last time the information was synchronized. The mobile device application may also show an out of sync icon next to any relevant item (file, folder, etc.). In response to an out of sync notification, the user can choose to apply those changes, as described above. In some embodiments, when a user initiates a synchronization process, all items are synchronized, not just the items currently being viewed.

In some embodiments, the mobile device application has a configuration setting that enables collections to be automatically synchronized. In this example, as soon as the application detects a change (e.g., via the notification API), the application automatically synchronizes files and folders.

As discussed above, a user can mark a collection as "offline." In some embodiments, the system allows a user to mark a folder as offline (even if it is not part of a collection), and the folder will be treated like the collections described above, with respect to downloads, synchronizations, etc.

Following is a description of an exemplary process for creating and sharing collections, in the context of the use case described above. In this exemplary use case, an office worker ("Jane Doe") has access to all of the relevant files needed by various field workers ("Bob") while performing maintenance activities. FIG. 1 is a diagram showing a screenshot of Jane's PC, which shows a list of files on the system. In one embodiment, Jane is using a browser-based desktop client to interact with the content management system. In this example, a folder called "Power Pole Procedures" contains 16 items and a folder called "Power Line Procedures" contains 6 items. For a given maintenance task, Bob may need access to a subset of these content items, but will not need access to all of them. As mentioned above, providing Bob with access to all documents is not efficient, and can lead to errors if Bob accesses and uses a wrong document.

Figure 2:
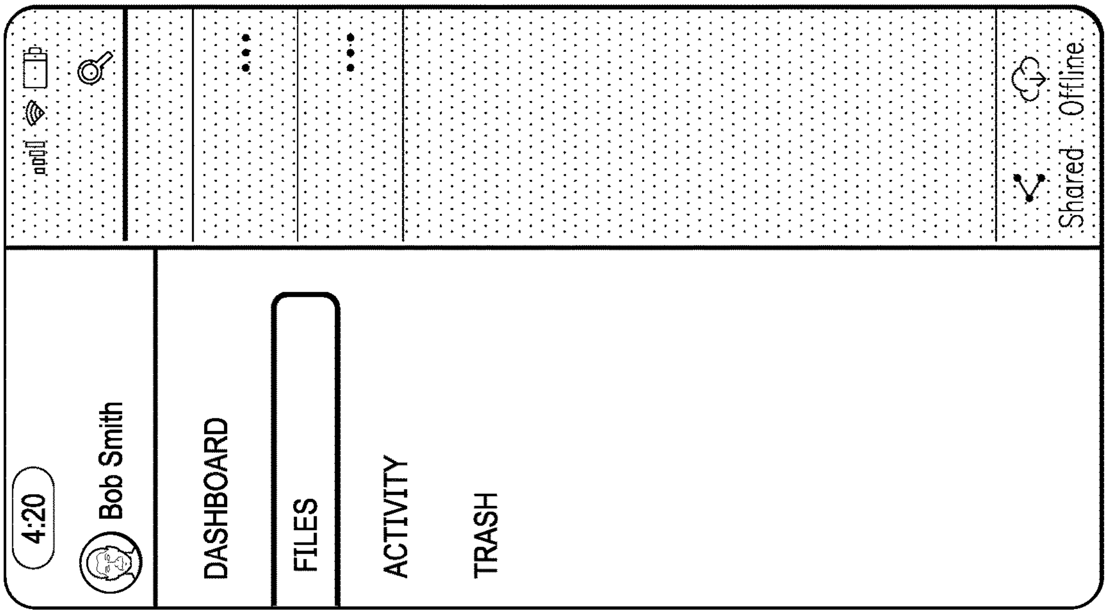
FIG. 2 is a diagram showing a screenshot of a display on a collection viewer's mobile device.

The office worker, using the content management system, can create a "collection" by tagging files and/or folders and giving the collection a name (e.g., "Northern California Gas Operation Documents"). FIG. 2 is a diagram showing a screenshot of Bob's mobile device, showing menu items "FILES", "ACTIVITY", and "TRASH." In one embodiment, Bob's mobile device is a smart phone, tablet, etc. running a mobile application or a browser-based client.

Figure 3:
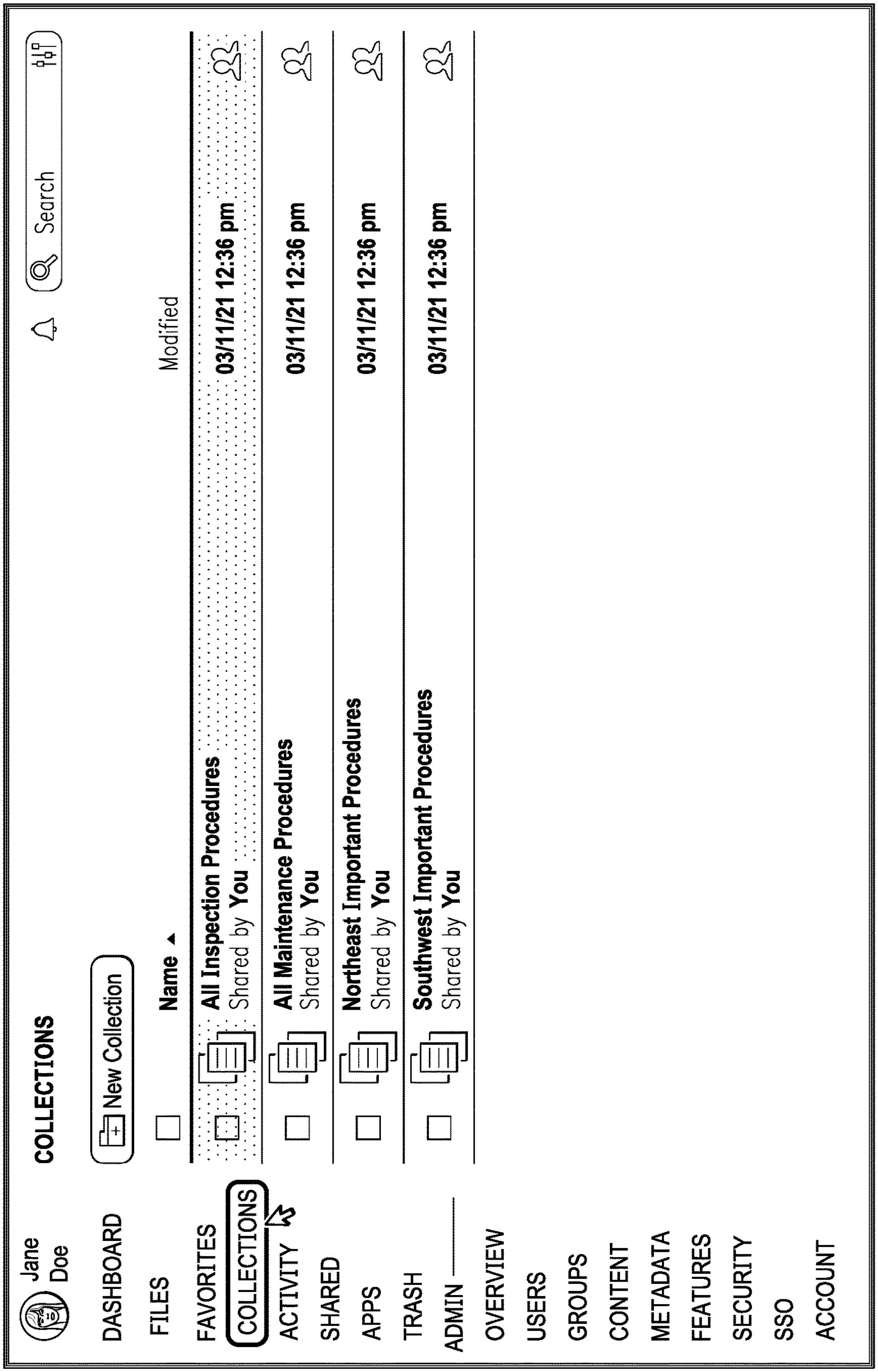
FIG. 3 is a diagram showing a screenshot of a display on a collection administrator's PC, showing a list of collections.

FIG. 3 is a diagram showing a screenshot of Jane's PC after she has selected the "COLLECTIONS" menu item on the navigation menu on the left of the screen. In this example, four existing collections are shown, including "All Inspection Procedures," "All maintenance Procedures," "Northeast Important Procedures," and "Southwest Important Procedures." The "All Inspections Procedures" may contain documents relating to inspection procedures spanning across many different folders, but are now stored in this one collection. These collections (i.e., virtual groupings) can be created and shared (described below).

Figure 4:
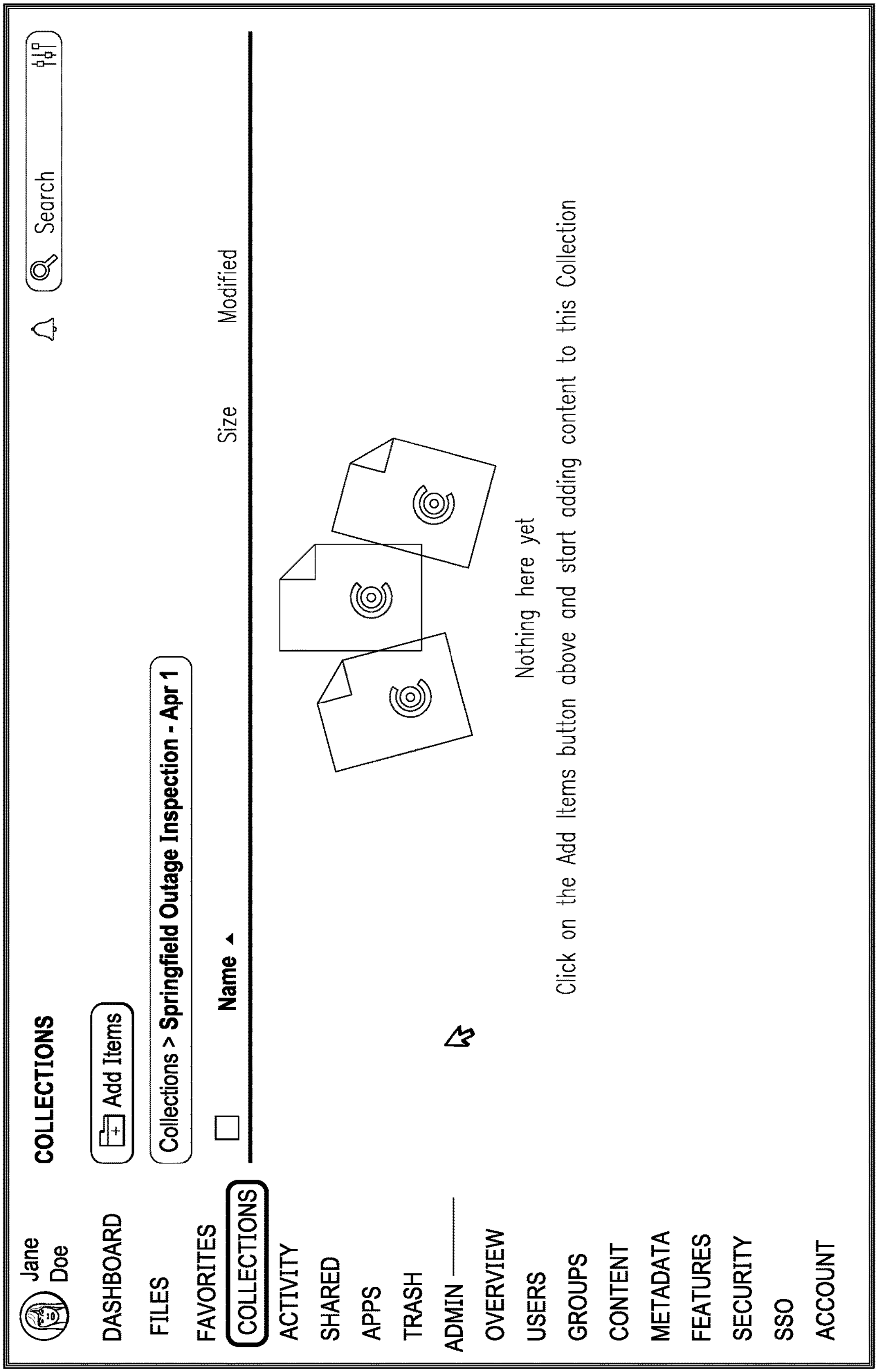
FIG. 4 is a diagram showing a screenshot of a display on a collection administrator's PC after a new collection is created.
Figure 5:
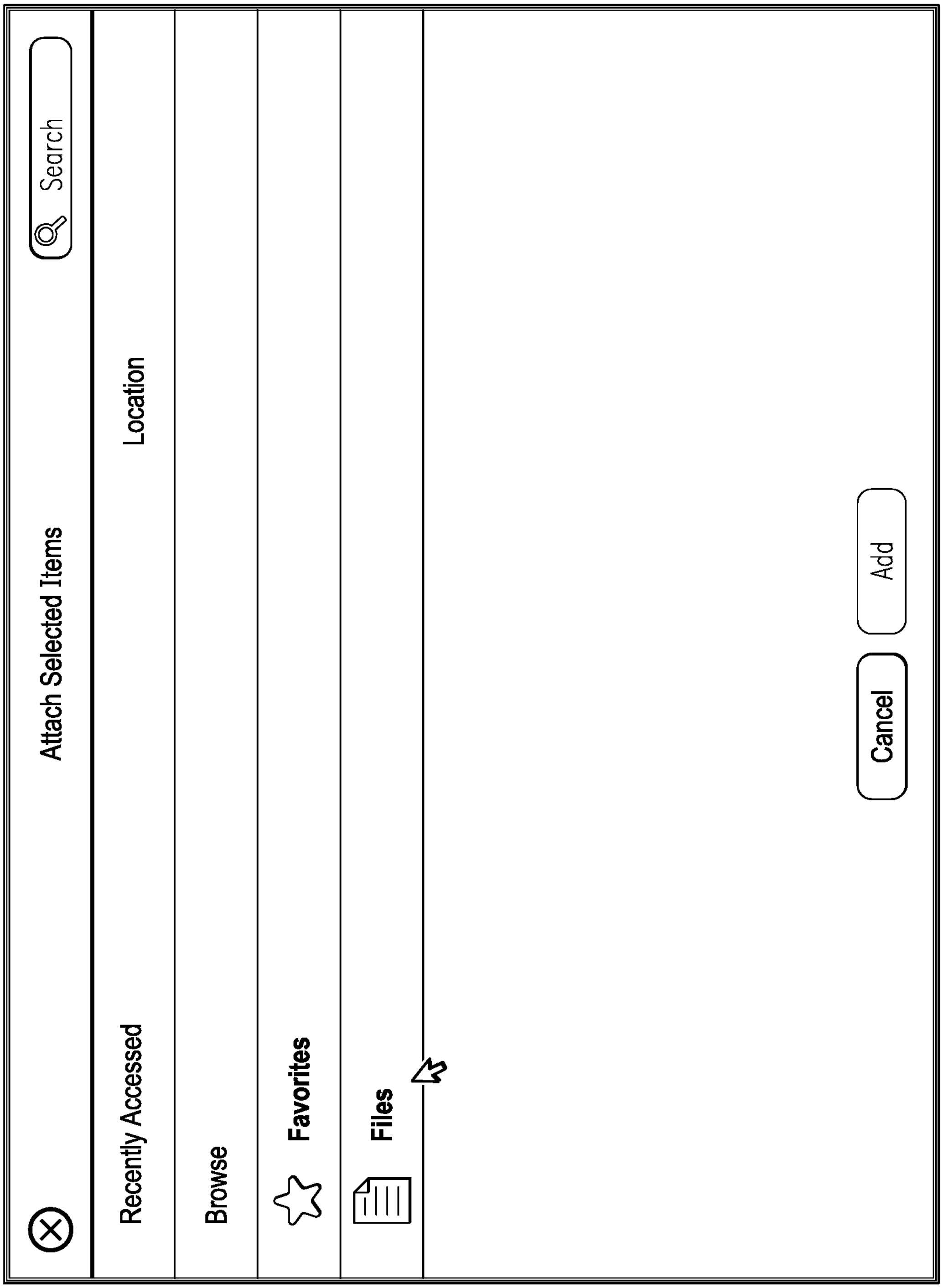
FIG. 5 is a diagram showing a screenshot of a display on collection administrator's PC showing a dialog that is presented after selecting the "Add Items" button.
Figure 6:
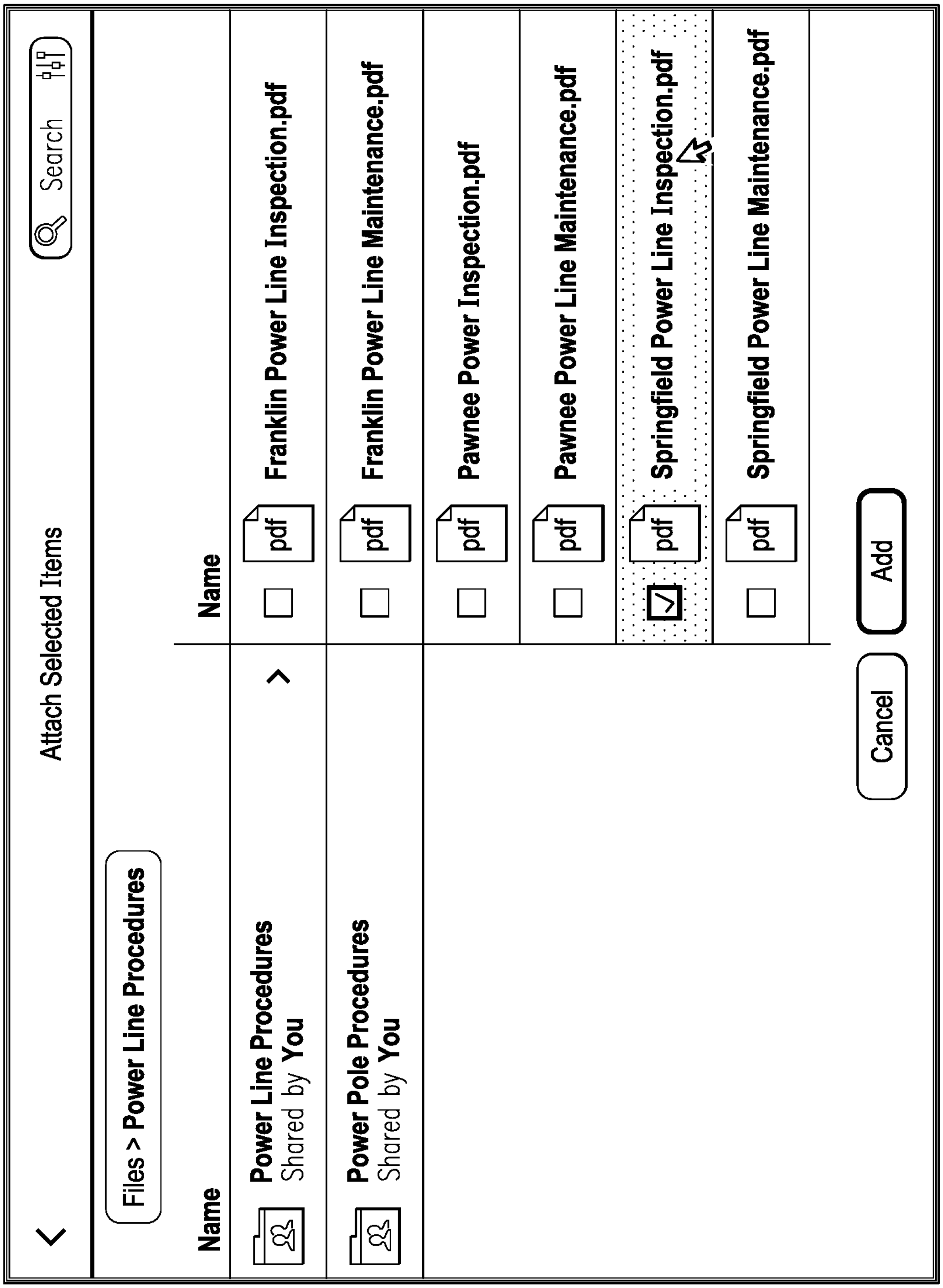
FIG. 6 is a diagram showing a screenshot of a display on collection administrator's PC showing a user selecting files to add to a collection.

The content management system worker (e.g., Jane Doe) can create ad hoc collections for a particular project or event. For example, assume Jane wants to create a new collection relating to a "Springfield Power Outage Inspection" relating to an outage inspection on a particular day. Jane can select the "New Collection" button (FIG. 3), create a name of the new collection, and create the new collection. FIG. 4 is a diagram showing a screenshot of Jane's PC after the new collection is created, and after Jane has selected the collection from the collections menu. As shown, the new collection does not yet have any contents. Jane can add content items to the new collection by selecting the "Add Items" button (FIG. 4) on the new collection page. FIG. 5 is a screenshot showing a dialog that is presented after selecting the "Add Items" button. From here, Jane can add files using the "Recently Accessed," "Browse," etc. menu items, and navigate the items that she wants to add. For example, Jane can select "Files," then navigate to "Power Line Procedures," and select the "Springfield Power Line Inspection" file, as illustrated in the screenshot of FIG. 6. This process can be repeated by Jane until all desired items are added to the new collection.

Figure 7:
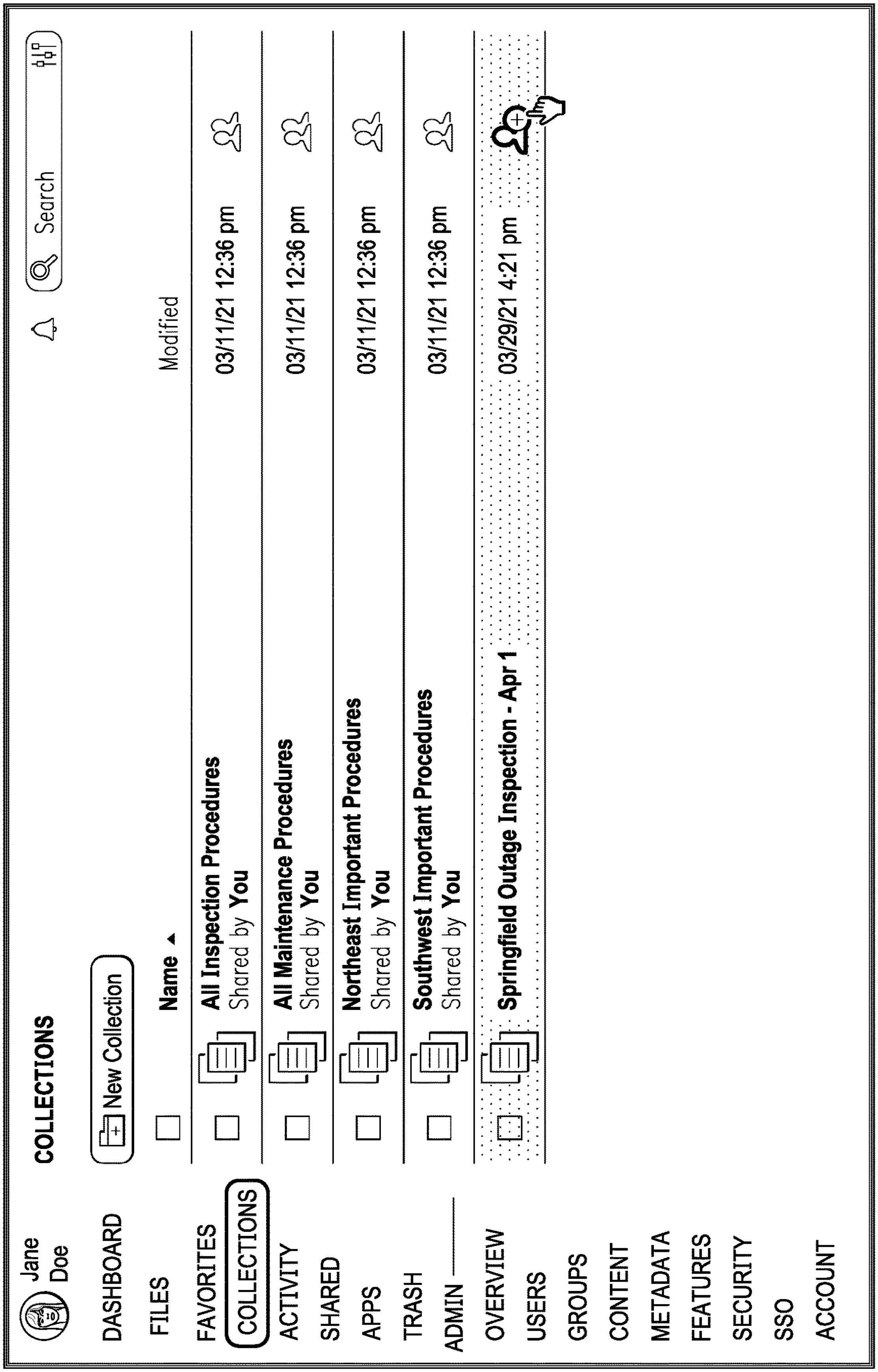
FIG. 7 is a diagram showing a screenshot of a display on collection administrator's PC showing the content items in a collection.
Figure 8:
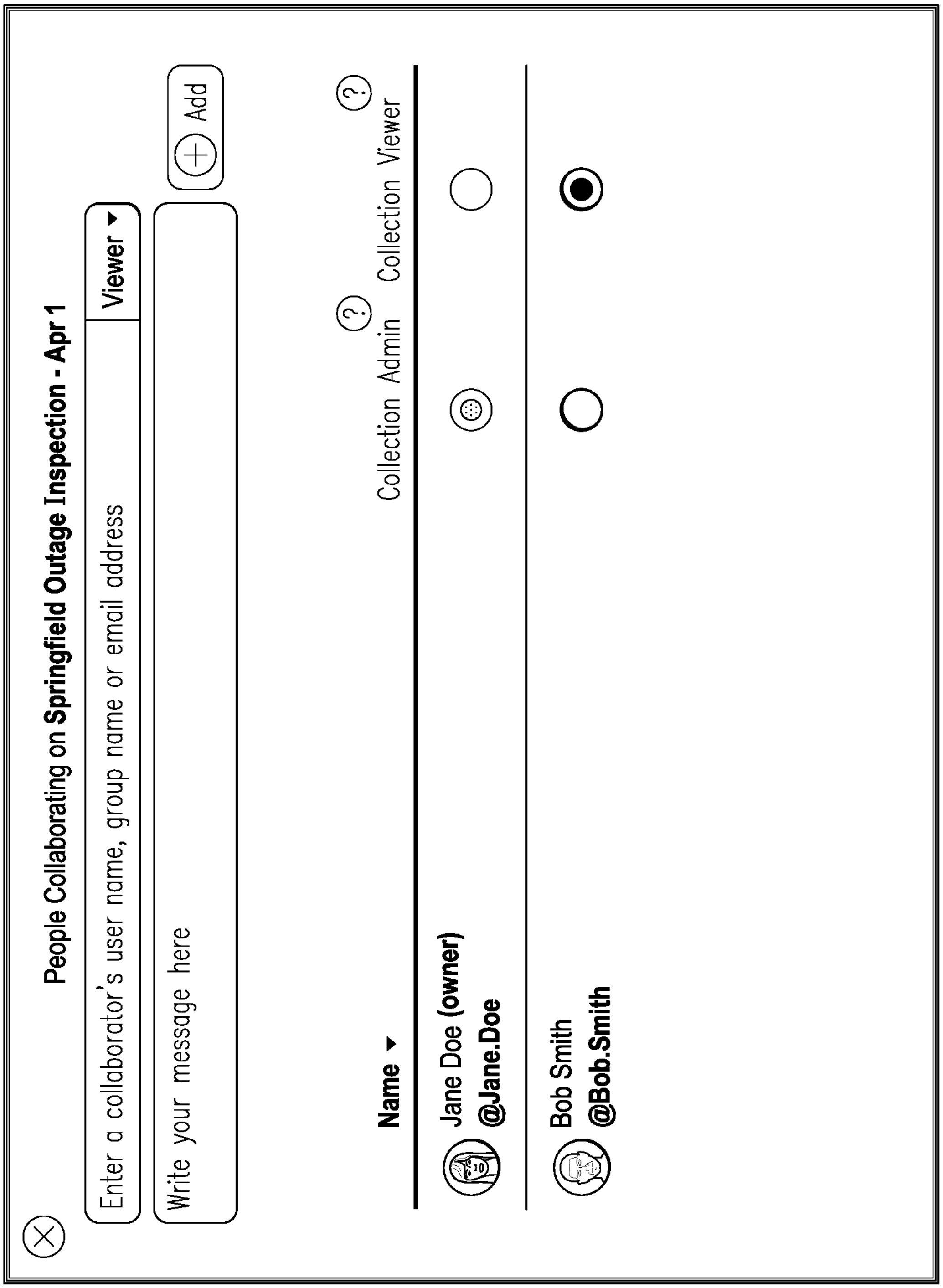
FIG. 8 is a diagram showing a screenshot of a display on collection administrator's PC showing a collection collaboration configuration menu.

Once the new collection is created, the collection will be listed among the other collections, as shown in FIG. 7. Now, Jane can share the collection with other users, such as Bob, by clicking on the sharing button on the right, which presents a collaboration menu, where Jane can select Bob (FIG. 8), and any other users that need to have access to the new collection. FIG. 8 also shows the status of the collaborators of the collection. In this example, Jane is shown as a "Collection Admin," and Bob is shown as a "Collection Viewer." In one example, Jane, as the collection admin is the only user that is able to edit and share the collection. However, if Jane made Bob a collection admin, Bob could also edit the collection and share the collection.

Figure 9:
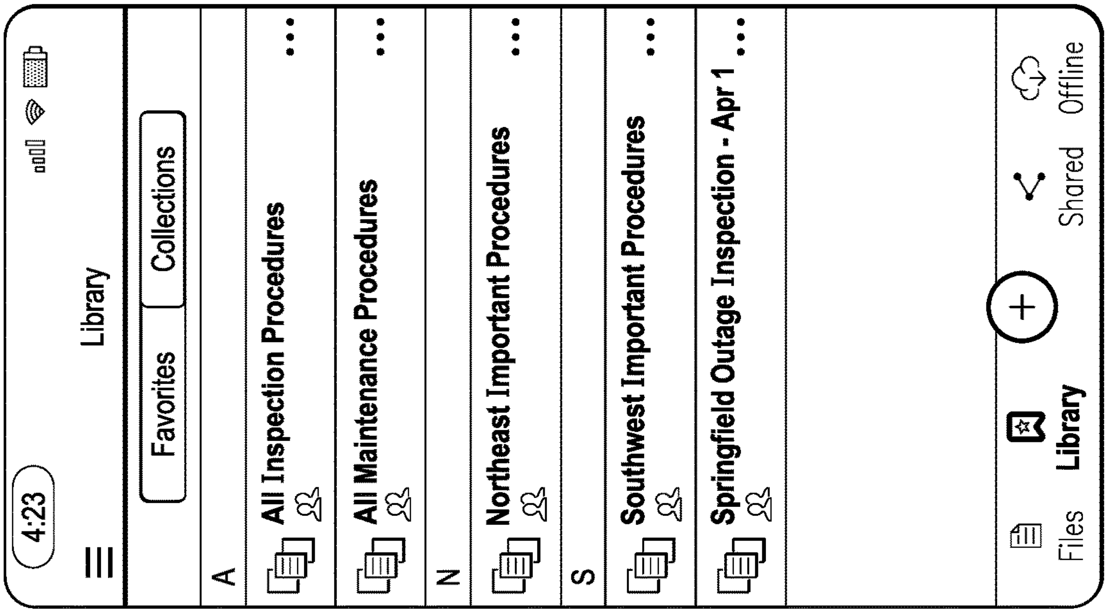
FIG. 9 is a diagram showing a screenshot of a display on a collection viewer's mobile device showing the new collection.

Once shared, a notification will be sent to Bob, letting him know that he has access to a new collection. FIG. 9 is a diagram showing a screenshot of Bob's mobile device, showing the new collection, which he can now access from his mobile device. As discussed above, one significant advantage for Bob over traditional content management systems, is that Bob does not have to navigate through many documents, finding the relevant documents that he needs, and downloading them for offline use.

Figure 10:
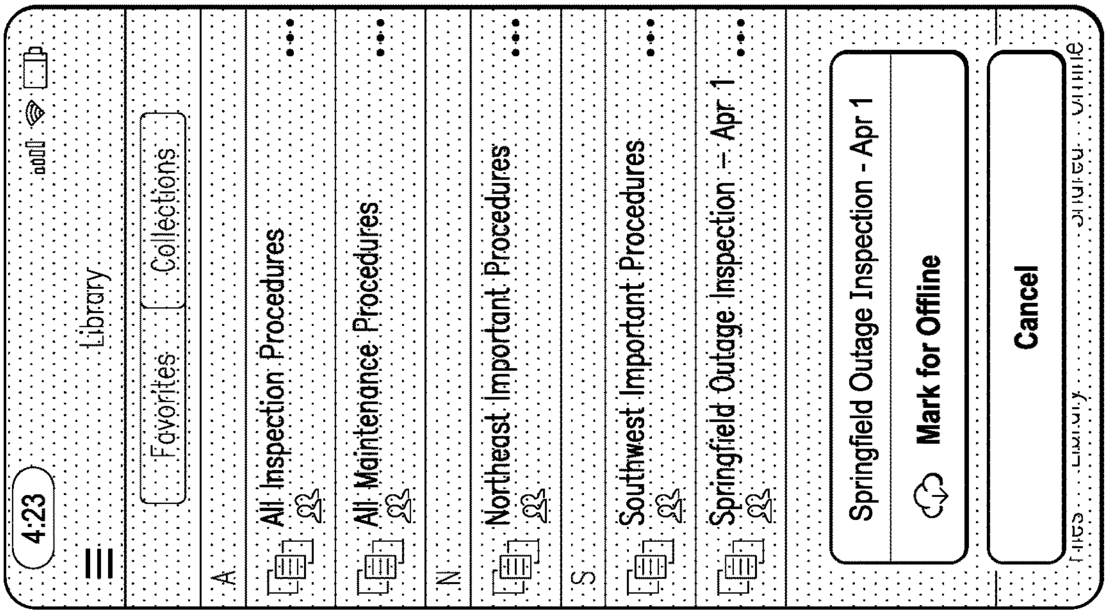
FIGS. 10-11 are diagrams showing screenshots of a display on a collection viewer's mobile device during download and synchronization processes.

At this point, Bob can tap on the "Springfield Outage Inspection" sub-menu (the three dots to the right of the collection title) to view the collection sub-menu, which is shown in the screenshot of FIG. 10. From the sub-menu, Bob can tap on "Mark for Offline," and the entire contents of that collection will be marked for offline storage (on Bob's mobile device) with one single action. In some embodiments, the system will first check the space available on the mobile device and an estimated size of the downloads and present a dialog to the user, where the user can select either "cancel" or "download." In response to "download" being selected by Bob, the files will start downloading to the mobile device. The files can be downloaded in any desired order.

Figure 11:
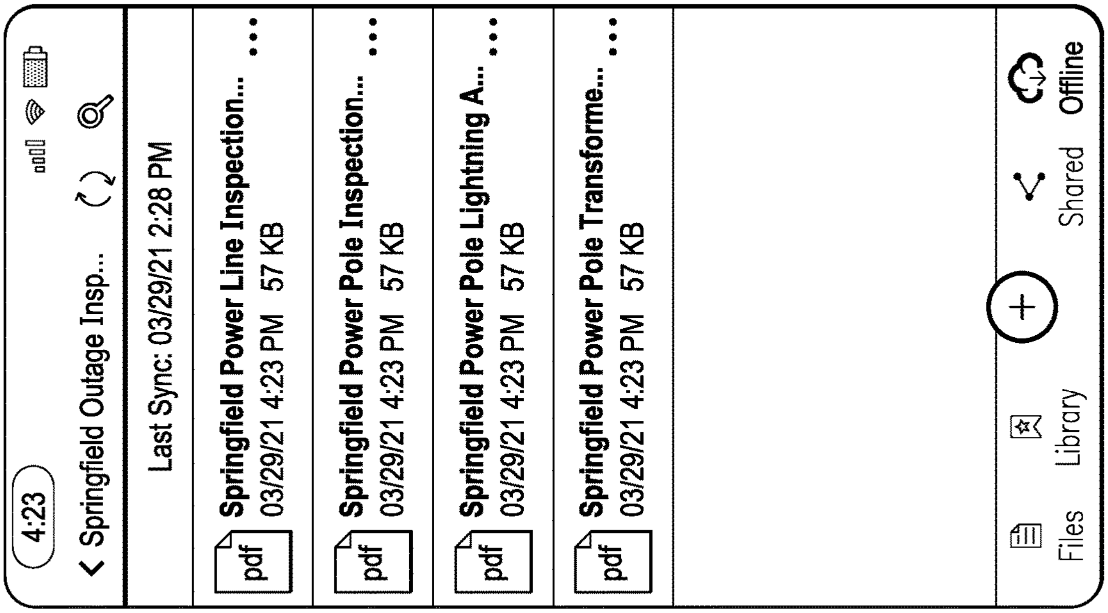

FIG. 11 is a diagram showing a screenshot of Bob's mobile device, listing the contents of the new collection (e.g., in an offline tab of the mobile application). As mentioned above, it is important that users have the latest versions of their collections stored on their mobile device. Above the list of items shown on FIG. 11, the time and date of the last synchronization is shown. Note that a few examples of synchronization procedures are discussed above. In one embodiment, the user (Bob, in this example) can press the sync button (near the top right of the screen in FIG. 11) before going to a job/project, to ensure that the files in his collections are up-to-date. When the sync button is pressed, the system will look at all of the offline files on the mobile device, and compare those files with the collections on the content management system. If the offline files are not up-to-date, an indication can be provided to the user and a re-down event will be triggered (or alternatively, the user is prompted to trigger the re-download event).

In some embodiments, whenever the user navigates to the offline tab of the mobile application (e.g., see FIG. 11), the system will determine whether the collection of content items stored on the remote device are synchronized with the collection of content items stored in the data store.

As mentioned above, for a user to gain access to content items, the user must have permission to access the item. For example, for Bob to have access to all of the items in the collection "Springfield Outage Inspection", he must have the appropriate permissions for each item (on a per resource basis). If there are any items in the collection for which Bob lacks the appropriate permissions, he will not be able to view or access these items, although he could still access other items in the collection. In this example, Jane (or another authorized person) would have to give Bob the needed permissions. In one embodiment, permissions are handled on a per-resource basis, not on a per-collection basis. Of course, other permission schemes can also be used with the invention.

In some embodiments, the system can be configured to notify a collection creator (e.g., Jane) whether a person with which she shared a collection (e.g., Bob) has the required permissions. For example, if Bob lacks the required permissions to access a particular file in the collection, the system can provide such an indication to Jane. Jane can then take whatever actions are needed to give Bob permissions. Similarly, the system can notify Bob that he lacks access to some resources that are a part of a collection, and can tell Bob to contact the collection administrator (e.g., Jane) to obtain the required permissions.

In some embodiments, the application installed on the mobile device enables a user (e.g., Bob) to take notes relating to a collection. The system can synchronize Bob's notes with the system, so the notes can be backed up, or shared with other users, or made available to Bob at a later time. The user created notes can also be synchronized with the content management system, similar to the synchronizations described above.

Figure 12:
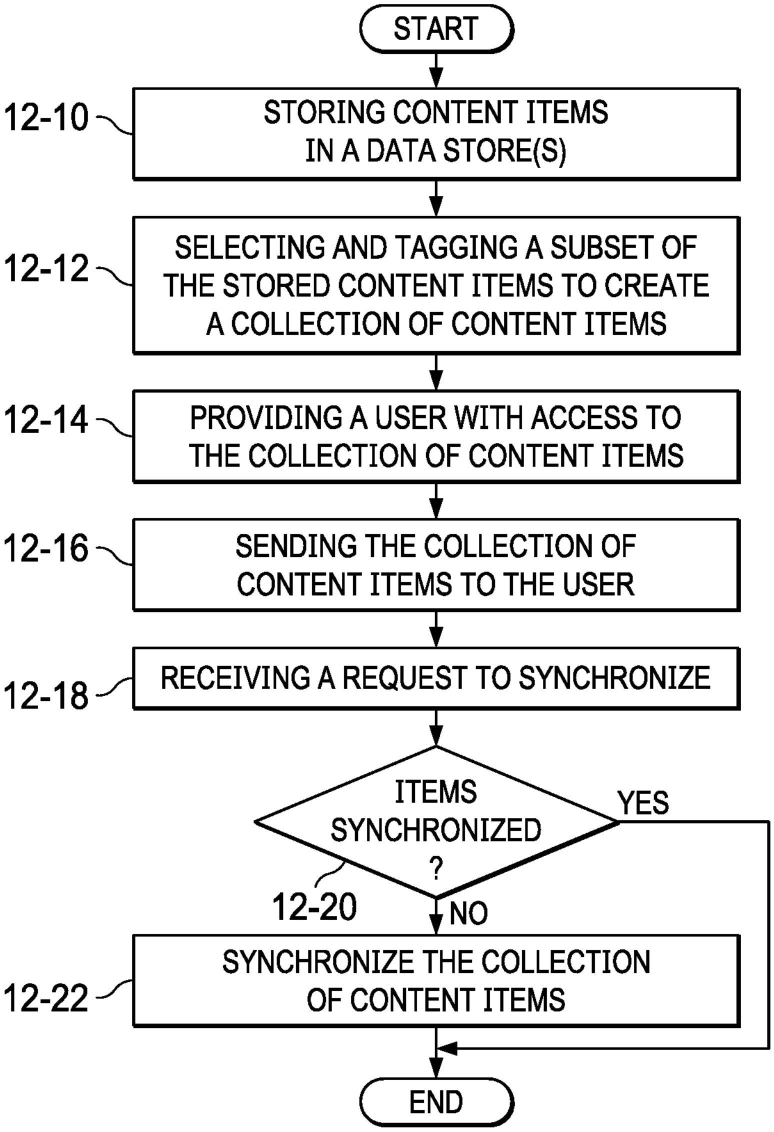
FIG. 12 is a flow diagram depicting one example of the operation of a method of managing content.

FIG. 12 is a flow diagram depicting one example of the operation of a method of managing content according to the techniques described above. The process begins at step 12-10, where a plurality of content items are stored in one or more data stores of a content management system. At step 12-12, a collection admin selects and tags a subset of the content items stored in the data store. As discussed above, certain of the items can be selected for a given project, or based on any other rational. At step 12-14, a user (e.g., a collection viewer) is provided with access to the collection of content items. With respect to the use case discussed above, contractors that may be performing maintenance tasks are given access to a collection relating to the task that they will perform.

At step 12-16, the content items that are part of the collection are sent to the user that was given access. Sending the collection to the mobile device may be responsive to a user request, or could happen automatically after the user is given access to the collection. In one example, the content items are stored on a mobile device controlled by the user, for use offline. As discussed in detail above, it may be important that the content items stored on the user's mobile device are up-to-date. Responsive to a synchronization request from the user (step 12-18), a synchronization process is triggered. If it is determined (at step 12-20) that the collection is already synchronized, the process ends. If it is determined (at step 12-20) that the collection is not synchronized, the collection of content items is synchronized (step 12-22), as described above.

Figure 13:
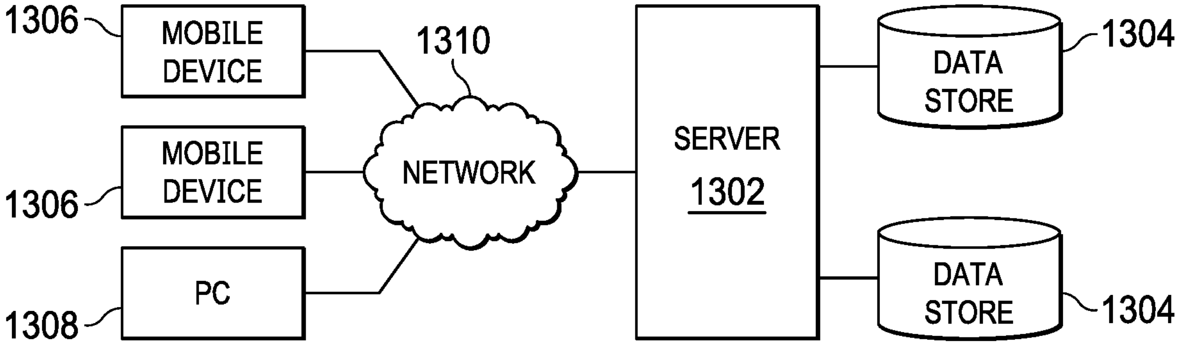
FIG. 13 is a diagram showing one example of a system architecture that could be used with the invention.

FIG. 13 is a diagram showing one example of a system architecture that could be used with the invention. FIG. 13 shows a server 1302 and associated data store(s) 1304 that can be used to store information that comprises collections. In the example where the system is implemented using a content management system, the content management system can be hosted on the server 1302. The server is in communication with mobile device(s) 1306 and PC(s) 1308 via a network 1310. In the examples provided above, the content viewers can use mobile devices 1306 to access collections of the content management system. The collection administrators can access the content management system using a PC 1308.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms “comprises,” “comprising,” “includes,” “including,” “has,” “having,” or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term “or” as used herein is generally intended to mean “and/or” unless otherwise indicated. For example, a condition A or B is satisfied by any one of the following: A is true (or present) and B is false (or not present), A is false (or not present) and B is true (or present), and both A and B are true (or present). As used herein, a term preceded by “a” or “an” (and “the” when antecedent basis is “a” or “an”) includes both singular and plural of such term, unless clearly indicated within the claim otherwise (i.e., that the reference “a” or “an” clearly indicates only the singular or only the plural). Also, as used in the description herein and throughout the meaning of “in” includes “in” and “on” unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: “for example,” “for instance,” “e.g.,” “in one embodiment.”

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A system for managing content comprising:

a processor; and a memory coupled with the processor, wherein the memory is configured to provide the processor with instructions which when executed cause the processor to:

responsive to a request from a first user, select and tag a subset of stored content items to create a collection of content items, the subset of the stored content items including content items stored across multiple folders in a data store of the system, wherein for at least one of the multiple folders in the data store, the at least one folder contains one or more content items that are part of the collection and other content items that are not part of the collection;

responsive to a request from a second user, send, to a remote device controlled by the second user, the collection of content items, wherein the collection of content items is stored in the remote device;

in an online mode, provide the second user with access to the collection of content items, wherein access by the second user is controlled based on a permission for the second user that is provided by the first user and is associated with the collection of content items;

to enable offline usage:

receive, at the remote device, an edit made by the second user to at least a portion of the collection of content items that are marked for offline use; and subsequent to receiving the edit made by the second user:

receive, at the remote device and from a server associated with the data store, information for the collection of content items in response to a notification application programming interface (API) call, wherein the notification API call was made in response to the second user navigating to a menu on the remote device that displays the portion of the collection of content items;

determine, at the remote device, whether the portion of the collection of content items is synchronized with the collection of content items stored in the data store based on comparing the collection of content items stored on the remote device to the information received from the server;

receive, from the remote device and in response to the remote device determining that the portion of the collection items is not up-to-date, a request to synchronize the portion of the collection of content items stored on the remote device with the collection of content items stored in the data store, and responsive to the request, synchronize the portion of the collection of content items stored on the remote device with the collection of content items stored in the data store, wherein the synchronizing includes deleting, by the remote device, at least one content item from the portion of content items stored on the remote device based on determining, by the remote device, that the at least one content item is present in the offline tab but has been deleted at the server.

2. The system of claim 1, wherein the collection of content items are marked by the second user for offline.

3. The system of claim 1, wherein the second user is provided with access to each content item of the collection of content items on a per resource basis in accordance with a user permission assigned to the second user for the respective content item.

4. The system of claim 1, wherein the instructions further comprise:

providing a user interface to a content administrator; and wherein the selecting and tagging the subset of the stored content items to create the collection of content items is performed responsive to the content administrator selecting content items using the user interface.

5. The system of claim 1, wherein, responsive to determining that the collection of content items stored on the remote device are not synchronized with the collection of content items stored in the data store, provide via the notification API an indication on the remote device that the collection of content items stored on the remote device are not synchronized.

6. The system of claim 1, wherein the instructions further comprising:

receiving, from the remote device, user created notes; and storing the received user created notes in the data store of the system.

7. The system of claim 6, wherein the instructions further comprise synchronizing the user created notes between the data store of the system and the remote device.

8. The system of claim 1, wherein the instructions further comprise sharing the edit made by the second user with a third user at a second remote device.

9. A computer program product comprising a non-transitory computer readable medium storing a set of computer instructions executable by a processor, the set of computer instructions comprising instructions for:

responsive to a request from a first user, selecting and tagging a subset of stored content items to create a collection of content items, the subset of the stored content items including content items stored across multiple folders in a data store of a system, wherein, for at least one of the multiple folders in the data store, the at least one folder contains one or more content items that are part of the collection and other content items that are not part of the collection;

responsive to a request from a second user, sending, to a remote device controlled by the second user, the collection of content items, wherein the collection of content items is stored in the remote device;

in an online mode, providing the second user with access to the collection of content items, wherein access by the second user is controlled based on a permission for the second user that is provided by the first user and is associated with the collection of content items;

to enable offline usage:

receiving, at the remote device, an edit made by the second user to at least a portion of the collection of content items that are marked for offline use, and subsequent to receiving the edit made by the second user:

receiving, at the remote device and from a server associated with the data store, information for the collection of content items in response to a notification application programming interface (API) call, wherein the notification API call was made in response to the second user navigating to a menu on the remote device that displays the portion of the collection of content items;

determining, at the remote device, whether the portion of the collection of content items is synchronized with the collection of content items stored in the data store based on comparing the collection of content items stored on the remote device to the information received from the server;

receiving, from the remote device and in response to the remote device determining that the portion of the collection items is not up-to-date, a request to synchronize the portion of the collection of content items stored on the remote device with the collection of content items stored in the data store, and responsive to the request, synchronizing the portion of the collection of content items stored on the remote device with the collection of content items stored in the data store, wherein the synchronizing includes deleting, by the remote device, at least one content item from the portion of content items stored on the remote device based on determining, by the remote device, that the at least one content item is present in the offline tab but has been deleted at the server.

10. The computer program product of claim 9, wherein the collection of content items are marked by the second user for offline.

11. The computer program product of claim 9, wherein the second user is provided with access to each content item of the collection of content items on a per resource basis in accordance with a user permission assigned to the second user for the respective content item.

12. The computer program product of claim 9, wherein the instructions further comprise:

providing a user interface to a content administrator; and wherein selecting and tagging the subset of the stored content items to create the collection of content items is performed responsive to the content administrator selecting content items using the user interface.

13. The computer program product of claim 9, wherein, responsive to determining that the collection of content items stored on the remote device are not synchronized with the collection of content items stored in the data store, providing an indication on the remote device that the collection of content items stored on the remote device are not synchronized.

14. A method of managing content in a content management system comprising:

responsive to a request from a first user, selecting and tagging a subset of stored content items to create a collection of content items, the subset of the stored content items including content items stored across multiple folders in a data store of the system, wherein, for at least one of the multiple folders in the data store, the at least one folder contains one or more content items that are part of the collection and other content items that are not part of the collection;

responsive to a request from a second user, sending, to a remote device controlled by the second user, the collection of content items, wherein the collection of content items is stored in the remote device;

in an online mode, providing the second user with access to the collection of content items, wherein access by the second user is controlled based on a permission for the second user that is provided by the first user and is associated with the collection of content items;

to enable offline usage:

receiving, at the remote device, an edit made by the second user to at least a portion of the collection of content items that are marked for offline use, and subsequent to receiving the edit made by the second user:

receiving, at the remote device and from a server associated with the data store, information for the collection of content items in response to a notification application programming interface (API) call, wherein the notification API call was made in response to the second user navigating to a menu on the remote device that displays the portion of the collection of content items;

determining, at the remote device, whether the portion of the collection of content items is synchronized with the collection of content items stored in the data store based on comparing the collection of content items stored on the remote device to the information received from the server;

receiving, from the remote device and in response to the remote device determining that the portion of the collection items is not up-to-date, a request to synchronize the portion of the collection of content items stored on the remote device with the collection of content items stored in the data store, and responsive to the request, synchronizing the portion of the collection of content items stored on the remote device with the collection of content items stored in the data store, wherein the synchronizing includes deleting, by the remote device, at least one content item from the portion of content items stored on the remote device based on determining, by the remote device, that the at least one content item is present in the offline tab but has been deleted at the server.

15. The method of claim 14, wherein the collection of content items are marked by the second user for offline.

16. The method of claim 14, wherein the second user is provided with access to each content item of the collection of content items on a per resource basis in accordance with a user permission assigned to the second user for the respective content item.

17. The method of claim 14, further comprising:

providing a user interface to a content administrator; and wherein selecting and tagging the subset of the stored content items to create the collection of content items is performed responsive to the content administrator selecting content items using the user interface.

18. The method of claim 17, further comprising:

receiving, over the user interface, a request from the content administrator to share the collection with a selected user; and providing a notification over the user interface indicating that the selected user does not have permission to access one or more of the selected content items.

19. The method of claim 18, further comprising providing a notification at a remote device used by the selected user indicating that the selected user does not have permission to access one or more of the selected content items.

* * * * *